Aug. 14, 1945.   R. P. ARMS   2,382,386
GAS ENGINE EXHAUST FLAME QUENCHER
Filed June 29, 1942
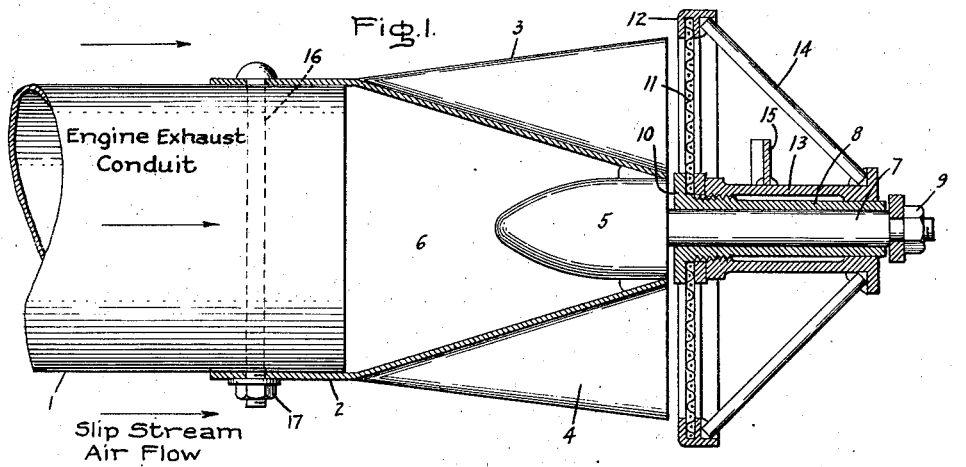
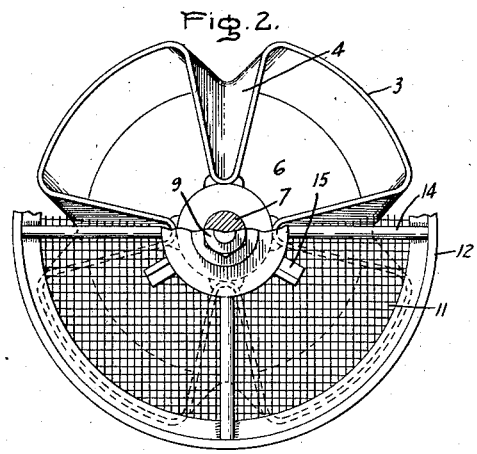
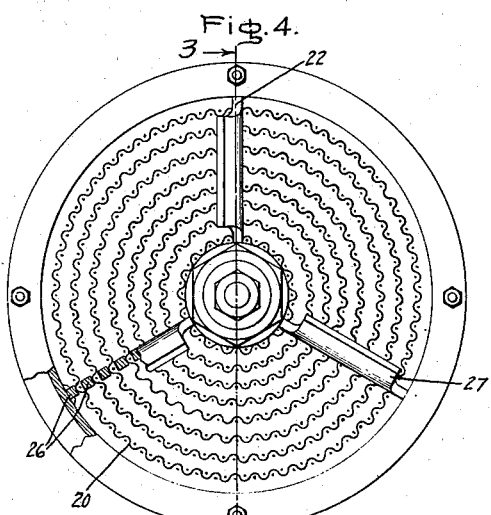
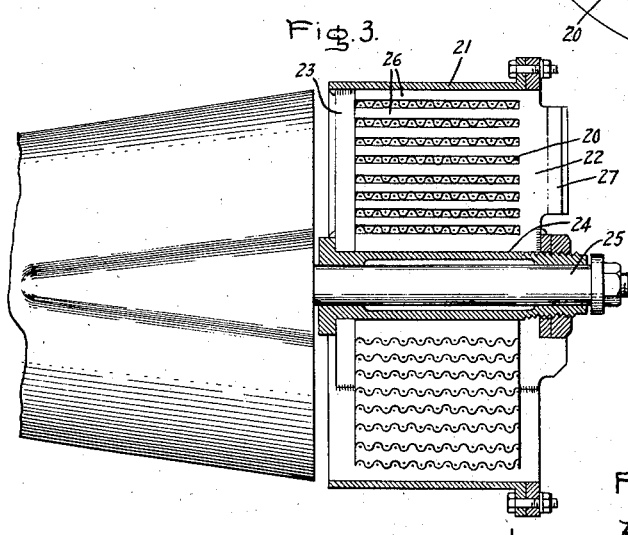
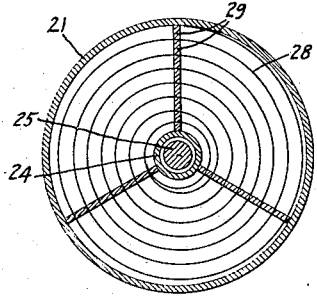
Inventor:
Richard P. Arms,
by Harry E. Dunham
His Attorney.

Patented Aug. 14, 1945

2,382,386

UNITED STATES PATENT OFFICE 2,382,386

GAS ENGINE EXHAUST FLAME QUENCHER

Richard P. Arms, Cambridge, Mass., assignor to General Electric Company, a corporation of New York Application June 29, 1942, Serial No. 449,041

5 Claims. (Cl. 60—31)

In connection with the operation of internal combustion engines, burning of unconsumed gases in the exhaust may occur adjacent to the exhaust end of an engine exhaust conduit. This is termed usually "after-burning." This is objectionable for a number of reasons, and is especially objectionable under certain operating conditions in connection with aircraft engines.

The object of my invention is to provide an improved construction and arrangement to prevent the burning of unconsumed fuel in the exhaust of an internal combustion engine. For a consideration of what I believe to be novel and my invention, attention is directed to the following specification and the claims appended thereto.

In the drawing, Fig. 1 is a sectional view of a flame quencher embodying my invention; Fig. 2 is an end view thereof, partly broken away; Figs. 3 and 4 are similar views of a modification; and Fig. 5 is a detail view of another modification.

According to my invention, I provide in connection with the exhaust conduit of an engine a flame quencher comprising a screen of suitable metal and means whereby the exhaust gases are directed through first one portion of the screen and then another portion, the portion through which gases are not flowing at any time being then subjected to the action of a cooling agent, such as a stream of air. With this arrangement, exhaust gases are continuously passed through a cooled screen, and in passing therethrough are cooled to such an extent that they will not support combustion on the down stream side of the screen. In the case of an aircraft engine, air from the slip stream of the propeller may be used for cooling purposes. A screen for use in carrying out my invention may take various forms, its extent depending upon the heat absorption capacity and cooling capacity required. For example, it may be in the form of one or more flat disks or in the form of a plurality of axially extending radially spaced layers formed from concentric cylinders of suitable material such as thin strip metal or wire screening, or from such material wound spirally.

Referring to the drawing, I indicates the exhaust conduit of an internal combustion engine. In the case of an aircraft, it may be located in such a position or an arrangement may be provided whereby air from the slip stream passes longitudinally of the exhaust conduit. This is indicated by arrows labeled "Slip stream air flow." Attached to the end of the exhaust conduit is an exhaust gas and cooling air flow directing conduit 2 which flares outwardly somewhat, as is indicated at 3, and is provided with crimps or indentations 4 which form longitudinally extending passages on the outside of the conduit. A number of crimps 4 are provided, there being four in the present instance, as shown in Fig. 2. The crimps are triangular in contour, deepening from the inlet to the discharge end of conduit 2. At their discharge end, they are suitably attached to a hub 5 by welding or other suitable means. There is thus provided a plurality of circumferentially spaced passages 6 for exhaust gases between each of which is interspersed a passage 4 for the flow of cool air. Carried by hub 5 is a stationary shaft 7 on which is mounted a rotatable tubular shaft 8 held in place by a nut 9. The inner end of tubular shaft 8 is provided with a flange 10 against which fits a radial inner portion of a wire mesh screen 11 supported at its periphery by a stiffening ring 12. The screen is held in place against flange 10 by a sleeve 13 which screws on to threads on shaft 7 adjacent to flange 10. At 14 are posts suitably connected to a ring 12 and sleeve 13 for strengthening the structure. Carried by sleeve 13 are a number of circumferentially spaced vanes 15 for effecting rotation of the screen. In the present instance, three vanes 15 are shown.

In operation, the exhaust gases from the engine and the cooling air flow through passages 6 and 4, respectively, and through the screen to atmosphere. The flowing gases strike vanes 15 and effect rotation of screen 11, the rotating shaft 8 turning on the fixed shaft 7. The screen in continuously passing in front of passages 4 is cooled by air flowing through it so that cool screen is continuously presented to the passages 6 for the flow of exhaust gases. The passages 4 are made of such size and the screen is rotated at such a speed that the screen is cooled to an extent such that at all times the exhaust gases in passing through it are cooled sufficiently to prevent their igniting on the down stream side of the screen. As is well known, a screen arranged in this way will not support combustion on its up stream side. Or, otherwise expressed, the proportion of exhaust gas sector area to cooling sector area is such that the total net heat transfer per unit time from exhaust gases to screen results in a screen temperature below the ignition point of the exhaust gas mixture.

Conduit 2 is held in place by a bolt 16 provided with a nut 17 on its end. By removing nut 17 and the bolt, the conduit 2 may be readily removed from the exhaust conduit. Also, as will be clear, the construction can be easily dismantled to insert a new screen 11.

In Figs. 3 and 4 is illustrated a modified construction wherein the screen is formed from a plurality of spaced concentric cylinders 20 carried by a metal frame comprising an outer wall 21, radial spokes 22 and 23 and a sleeve 24 rotatably mounted on a stationary shaft 25 which corresponds to shaft 7 of Figs. 1 and 2. In the present instance, spokes 22 are shown as being provided on one side with axially extending spaced arms 26 located between cylinders 20 for spacing them apart and on the other side with vanes 27 corresponding to vanes 15 of Figs. 1 and 2. The various parts may be suitably welded and bolted together.

In Fig. 5 is indicated a modified form of screen comprising a strip of metal 28 spirally wound, the convolutions being separated by suitable spacers 29.

I prefer the use of vanes for effecting rotation of the screen but other suitable means may be used. The vanes may be designed to give the needed speed of rotation and the arrangement may be such that friction between the parts or viscous damping of the bearings will prevent overspeed. The speed need not be regulated precisely, the primary requirement being that it be high enough to prevent possible excessive local screen temperatures, thus rendering operation ineffective.

In each of the arrangements, the crimps 4 are made radial sectors so that the proportion of exhaust to cooling sectors is approximately the same at all distances from the central axis.

In accordance with the provisions of the patent statutes, I have described the principle of operation of my invention, together with apparatus which I now consider to represent the best embodiments thereof, but I desire to have it understood that the apparatus shown is only illustrative and that the invention may be carried out by other means.

What I claim as new and desire to secure by Letters Patent of the United States is:

1. For use in connection with an exhaust conduit of an internal combustion engine, a flame quencher comprising a casing structure having longitudinally extending crimps which define passages for the flow of cooling medium, a screen over the end of said structure, and means for effecting rotation of said screen.

2. For use in connection with an exhaust conduit of an internal combustion engine, a flame quencher comprising a casing having walls which define passages for the flow of exhaust gases and passages for the flow of cooling air, a screen structure rotatably mounted over the discharge ends of said passages, and vanes on the structure against which gases may impinge to effect rotation of the structure.

3. A flame quencher for exhaust gases comprising walls defining adjacent passages for discharge of exhaust gases directly to atmosphere and flow of cooling air from a slip stream, a screen which stands in the path of flow from said passages, and vanes carried by the screen for effecting rotation of the screen.

4. The combination with an exhaust conduit through which exhaust gases discharge directly to atmosphere, of walls forming a passage for flow of cooling air from a slip stream, a screen which stands in the path of flow of gases from said exhaust conduit and said passage, and vanes on said screen against which slip stream air impinges to effect rotation of the screen.

5. The combination with an exhaust conduit through which exhaust gases discharge directly to atmosphere, of walls forming a passage for flow of cooling air from a slip stream, a screen which stands in the path of flow of gases from said exhaust conduit and said passage, and vanes on said screen against which exhaust gases impinge to effect rotation of the screen.

RICHARD P. ARMS.